Dec. 11, 1934.  D. B. BULLARD  1,984,052

MACHINE TOOL DRIVING CONNECTION

Filed Oct. 22, 1932

INVENTOR.
DUDLEY B. BULLARD
BY
ATTORNEYS.

Patented Dec. 11, 1934

1,984,052

UNITED STATES PATENT OFFICE 1,984,052

MACHINE TOOL DRIVING CONNECTION

Dudley B. Bullard, Southport, Conn., assignor to The Bullard Company, a corporation of Connecticut Application October 22, 1932, Serial No. 639,029

11 Claims. (Cl. 74—339)

This invention relates to drive connections and is of a type particularly designed for use in connection with machine tools of the indexing type such as disclosed in Patent No. 1,360,175 in which a spindle is adapted to be driven at various points in an orbital path through which it moves.

In connection with this and other types of mechanisms, the shafts of the gears are moved with respect to each other so as to bring the gears into mesh. The obvious difficulty has been that there is no assurance against the points of the gear teeth striking as they are moved into driving relation. Such clashing of the gears injures the gear teeth and may result in a breaking or seriously straining the whole mechanism. Many attempts have been made to avoid this difficulty. One widely used mechanism consists of means for raising either the driven or driving gear as it approaches the complimentary gear and permitting the gear to move axially into mesh after the axes of the gears are in proper relation. While this means is operative, it will be obvious that the ends of the engaging teeth will occasionally abut so as to delay engagement until power is applied to the driving gear. In mechanism of the type referred to, power is customarily disengaged during the movement of the shafts, power being applied only after the gears have been placed into proper axial relationship for engagement.

It is an object of the present invention to provide an improved, simple and efficient arrangement for easily and safely establishing driving relation between gears which are brought into position through relative movement of the shafts.

Other objects of the invention are concerned with structural details in the provision of a simple and inexpensive mechanism for accomplishing the foregoing desideratum.

Briefly, the invention consists of providing, in connection with a pair of relatively movable shafts, a movable gear which by axial movement is disconnected from positive driving relation with its shaft. Thus, the gear is moved axially to allow movement of the shafts to place the axes of the gears in relationship, it will be disconnected from drive by its shaft and subsequent axial movement will permit its teeth to enmesh by endwise movement with the teeth of the other gear prior to the re-establishment of its positive driving connection with its shaft.

In the drawing

Figures 1, 3:
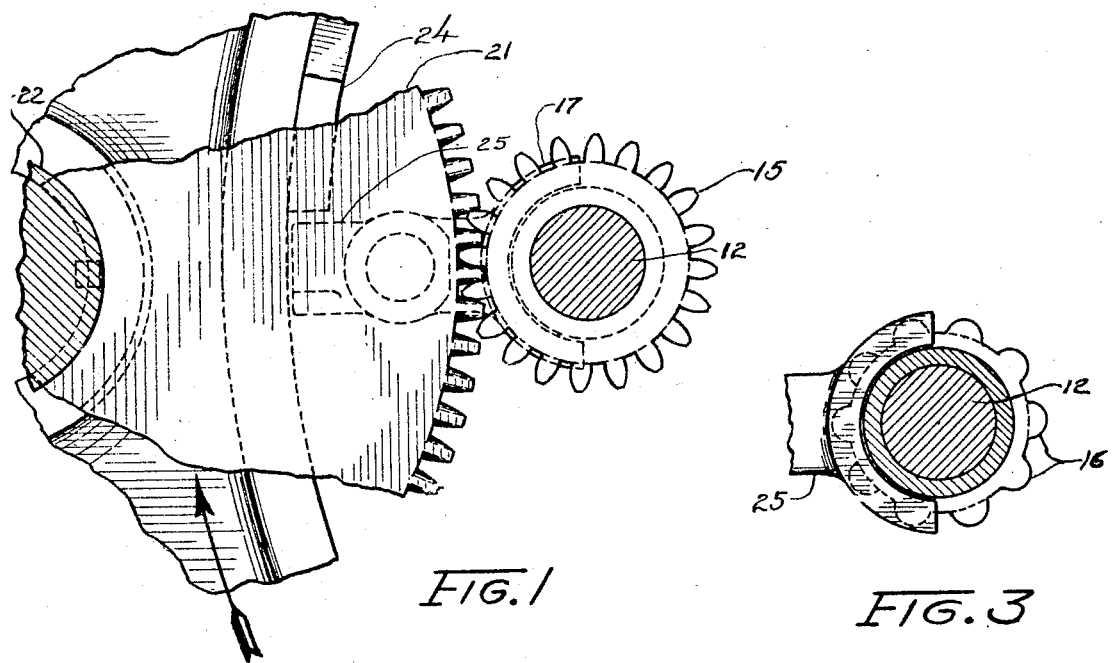
Fig. 1 is a horizontal section showing one preferred application of the inventive concept.
Fig. 3 is a horizontal section taken on line 3—3 of Fig. 2.

The drawing, which discloses one of the many possible practical applications of the invention, shows a fragmentary portion of a machine of the indexing type in which there are customarily several units comprising driving and driven elements, the elements being adapted to be engaged through indexing movement of a carrier for the driven elements whereby they may all be driven simultaneously. It is deemed sufficient for complete disclosure to illustrate in the drawing but one representative pair of gears and their cooperating parts.

The base 10 has journalled therein a driving clutch 11 keyed for rotation with a driving shaft 12. The clutch 11 comprises a sleeve having an enlarged upper cupped portion 13 within which are internal clutch teeth 14. A driving gear 15 is slidably mounted upon shaft 12, being adapted to receive motion from the shaft 12 when in its lower position through the clutch 11. For establishing driving relation the driving gear 15 is provided with a downwardly directed elongated hub having on its lower periphery external clutch teeth 16 which are shaped to fit within the cup 13 and engage and be driven by the internal teeth 14 of the driving clutch 11.

It will be noted that the lower half portion of every alternate tooth of the clutch teeth 16 has been cut away and that the teeth of the clutch 11 are spaced so as to provide a number equal to the number of the long teeth of the hub. This particular construction allows much angular freedom during the initial engaging movement of the parts and consequently much ease of engagement. After the long external teeth have entered a substantial distance into engagement, the shorter alternate teeth also enter, thus effectively eliminating backlash.

For controlling the axial movement of gear 15, a shifting fork 17 of substantially semi-circular form constantly engages an annular groove 18 formed in the hub of the gear, the fork being journalled for sliding movement with the gear by an apertured portion 19 mounted upon a guide bar 20 fixed in the base 10 parallel to shaft 12. Fixed upon an internal cylindrical surface of a carrier 23 is a cam 24 which is adapted to engage at the proper point in its movement a lug 25 projecting from the portion 19 of the shifting fork. It will be clear that in its movement in a circular path, cam 24 by its engagement with lug 25 is adapted to impart a sliding motion to shifting fork 17 and thus to gear 15.

A driven gear 21 is keyed to a driven shaft or spindle 22 mounted in suitable bearings in the carrier 23. The carrier 23 in the present embodiment, is substantially annular in form and surrounds the base 10, suitable bearing surfaces, not shown, maintaining the base and carrier in concentric relationship. The carrier is adapted to be indexed in a step by step movement, thus to carry the several driven units such as gear 21 and its spindle 22 in an orbital path around the base 10 in a direction shown in Fig. 1 by the large arrow.

Figures 2, 4:
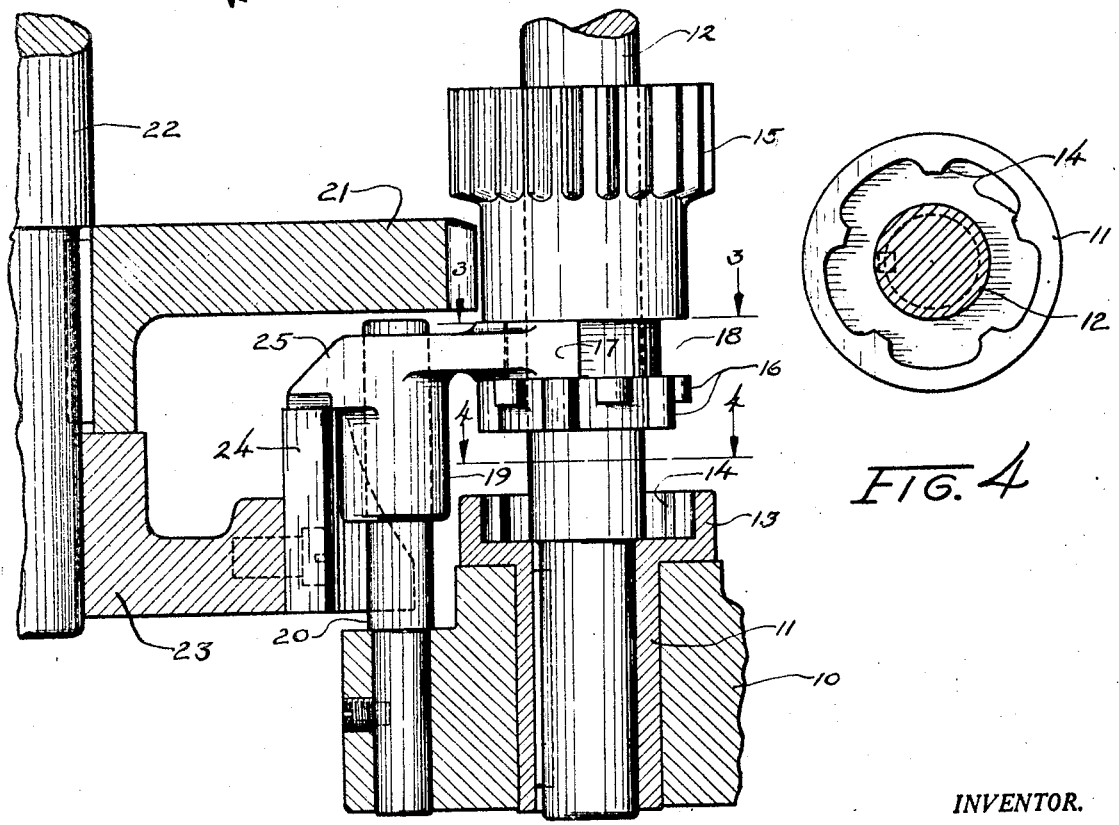
Fig. 2 is a vertical section of the invention as shown in Fig. 1.
Fig. 4 is a section taken on line 4—4 of Fig. 2.

As shown in Figs. 1 and 2, the carrier brings the axis of the driven gear into proper relationship to the axis of the driving gear 15 for their subsequent engagement. Cam 24 is of sufficient length in its upper flat portion or dwell to insure that the gear 15 will have been lifted to its uppermost position as gear 15 approaches its driving position, thus preventing interference, the latter edge of cam 24 being entirely free from engagement with lug 25 so that any downward force, such as gravity or a spring, would tend to move the shifting fork and the gear 15 downwardly.

From Fig. 2, it will be seen that the axial length of the clutch teeth is considerably less than that of the gear teeth and that the vertically spaced relationship of the gear teeth and the clutch teeth are such that the gear teeth must partially engage before any engagement can occur between the clutch teeth. It will be further seen that the completion of the engagement of the gear teeth and the engagement of the clutch teeth occurs simultaneously, the clutch teeth starting to engage only after the gear teeth have safely enmeshed for a considerable portion of their length. By the above provisions, the gear teeth must always be in driving relationship before any positive rotary movement can be imparted through them. It should be here explained that in the seldom occurring instances wherein the end portions of the teeth of the gears exactly coincide, thus preventing further axial movement, there is always present a slight inherent friction between the outer surface of shaft 12 and the inner surface of the gear 15 which friction provides sufficient torque to rotate the gear 15 the slight amount necessary to bring the gear teeth into proper engaging relationship. This relationship is further facilitated by rounding the engaging ends of the teeth of both gears.

While in the embodiment shown the force of gravity alone is sufficient to move the gear 15 downwardly into engagement, in other applications of the invention the parts might be horizontally disposed. In such case, a spring or other suitable yieldable means would be incorporated to normally urge the parts toward engaging position. The invention might be successfully applied to further variations wherein the power might be applied through the shaft 22. Obviously, other changes and modifications of the inventive concept which is here illustrated in only one of its various possible embodiments may be resorted to without departure from the spirit or scope of the invention as outlined in the appended claims.

Obviously, the teeth of the clutch may be formed of any desirable shape so as to provide for inter-engagement with a correspondingly formed clutch cup.

Having thus set forth the nature of my invention, what I claim is:

1. In a power-transmitting mechanism, a shaft, a gear translatable and rotatable concentric with said shaft, an even number of clutch teeth upon said gear, an alternate half of said clutch teeth being shorter than the other half, a clutch member fixed to said shaft, said clutch member having clutch teeth of a number and a length equal to the longer clutch teeth on said gear, a second shaft bodily movable with respect to the first mentioned shaft, a second gear upon the second shaft, means for translating the first mentioned gear first to partially engage its gear teeth with the second gear, subsequently to engage its long clutch teeth with the driving side of the clutch teeth of said clutch member and lastly to engage its short clutch teeth with the free side of the clutch teeth of said clutch member whereby the completion of the gear tooth engagement and the clutch tooth engagement occurs simultaneously.

2. In a power-transmitting mechanism, a pair of relatively and bodily movable shafts, cooperating gears on said shafts, means for moving one of said gears axially on its shaft out of position for cooperation with the gear of the other shaft and means for disconnecting the driving relation of said axially moving gear with said shaft upon its axial movement thereof.

3. In a power transmitting mechanism, a pair of relatively and bodily movable shafts, cooperating gears on said shafts arranged for driving and driven relation when lying in the same plane, one of said gears including means for disengaging it from driving relation with its shaft upon axial movement thereof from the plane of the other gear.

4. In a power-transmitting mechanism, a pair of relatively and bodily movable shafts, cooperating gears on said shafts arranged for driving and driven relation when lying in the same plane, one of said gears including means for disengaging it from driving relation with its shaft upon axial movement thereof from the plane of the other gear, said means including cooperating clutch elements on said gear and shaft.

5. In a power-transmitting mechanism, a pair of relatively and bodily movable shafts, gears on said shafts, means operable by relative movement between the shafts to move one of said gears axially to and from the plane of the other gear and means to connect and disconnect said gear from drive by its shaft upon movement thereof to and from the plane of the other gear.

6. In a driving connection, the combination of a pair of relatively and bodily movable shafts, gears carried by said shafts and adapted for relative movement with the shafts to bring their axes into position to permit driving relation therebetween, means to axially move one of said gears into and out of the plane of the other gear and means to disconnect said gear from its shaft when it is out of the driving plane.

7. In a machine tool, bodily movable driving and driven shafts, gears on said shafts, means to move said shafts into position for the gears thereof to enmesh, means to move one of said gears from the plane of the other gear to permit free movement of the shafts to said position and means for disconnecting said gear from positive drive by its shaft when said gear moves from the plane of its cooperating gear.

8. In a machine tool, bodily movable driving and driven shafts, gears on said shafts, means to move said shafts into position for the gears thereof to enmesh, means to move one of said gears from the plane of the other gear to permit free movement of the shafts to said position and means for disconnecting said gear from positive drive by its shaft when said gear moves from the plane of its cooperating gear, said last mentioned means including a clutch engageable to permit rotary lost motion between said shaft and gear.

9. In a machine tool, bodily movable driving and driven shafts, gears on said shafts, means to move said shafts into position for the gears thereof to enmesh, means to move one of said gears from the plane of the other gear to permit free movement of the shafts to said position and means for disconnecting said gear from positive drive by its shaft when said gear moves from the plane of its cooperating gear, said last mentioned means including a clutch engageable to permit rotary lost motion between said shaft and gear and further engageable to prevent rotary motion between said shaft and gear.

10. In a machine tool, bodily movable driving and driven shafts, gears on said shafts, means to move said shafts into position for the gears thereof to enmesh, means to move one of said gears from the plane of the other gear to permit free movement of the shafts to said position and means for disconnecting said gear from positive drive by its shaft when said gear moves from the plane of its cooperating gear, said gear being under frictional rotary impulse while disconnected from positive drive by its shaft.

11. In a multiple spindle machine, the subcombination of a shaft, a driving clutch on said driving shaft, a driving gear translatably and rotatably mounted on said driving shaft, clutch teeth on said gear for engagement with said driving clutch, a carrier adapted to receive a step by step rotation, a driven shaft within said carrier, a driven gear upon said driven shaft, the axis of said driven shaft being placed in driving relationship with the axis of the driving shaft during the rest periods of the carrier, and means actuated by the carrier rotation for translating said driving gear into mesh with said driven gear and subsequently to engage said clutch teeth with said driving clutch.

DUDLEY B. BULLARD.